US008954731B2

(12) United States Patent
Tenenboym et al.

(10) Patent No.: US 8,954,731 B2
(45) Date of Patent: Feb. 10, 2015

(54) DISTRIBUTIVE COMPUTATION OF A DIGITAL SIGNATURE

(71) Applicants: Isak Tenenboym, San Jose, CA (US); Philip Levy, Los Altos, CA (US); Marc T. Kaufman, Woodside, CA (US)

(72) Inventors: Isak Tenenboym, San Jose, CA (US); Philip Levy, Los Altos, CA (US); Marc T. Kaufman, Woodside, CA (US)

(73) Assignee: Adobe Systems Incorporated, San Jose, CA (US)

( * ) Notice: Subject to any disclaimer, the term of this patent is extended or adjusted under 35 U.S.C. 154(b) by 52 days.

(21) Appl. No.: 13/689,589

(22) Filed: Nov. 29, 2012

(65) Prior Publication Data

US 2014/0149735 A1 May 29, 2014

(51) Int. Cl.
*H04L 29/06* (2006.01)
*H04L 9/32* (2006.01)

(52) U.S. Cl.
CPC ............ *H04L 63/0823* (2013.01); *H04L 63/12* (2013.01); *H04L 9/3236* (2013.01); *H04L 9/3247* (2013.01); *H04L 9/3268* (2013.01)
USPC .......................................................... 713/156

(58) Field of Classification Search
CPC ............ H04L 29/00; H04L 9/00; H04L 29/06
USPC ................................................. 713/156, 167
See application file for complete search history.

(56) References Cited

U.S. PATENT DOCUMENTS

| 6,848,048 | B1 * | 1/2005 | Holmes ......................... 713/162 |
| 7,162,635 | B2 * | 1/2007 | Bisbee et al. ................. 713/176 |
| 7,290,138 | B2 * | 10/2007 | Freeman et al. .............. 713/167 |
| 8,347,082 | B2 * | 1/2013 | Sato et al. ...................... 713/158 |
| 2009/0300364 | A1 * | 12/2009 | Schneider ..................... 713/178 |

* cited by examiner

*Primary Examiner* — Teshome Hailu
*Assistant Examiner* — Thanh Le
(74) *Attorney, Agent, or Firm* — Shook Hardy & Bacon LLP (57) ABSTRACT

A method and apparatus are presented to perform a distributive computation of a digital signature in a document signing process. A signing request from a remote device initiates the document signing process including the distributive computation. The server verifies digital certificates corresponding to a signer's public key. An encryption request including a set of authenticated attributes and a hash value based on the to-be-signed content is transmitted to the remote device. A signer at the remote device encrypts the hash value in the encryption request with an encryption process utilizing a private key. The resulting encrypted hash value is transmitted to the server to produce the digital signature used to sign the subject content. This distributive computation process minimizes the amount of data transmitted between devices, while minimizing remote device resource requirements, and maintains the integrity of the signer's private key during generation of the digital signature.

23 Claims, 6 Drawing Sheets

FIG. 6

DISTRIBUTIVE COMPUTATION OF A DIGITAL SIGNATURE

TECHNICAL FIELD

This patent document pertains generally to electronic signature services, and more particularly, but not by way of limitation, to distributive computation of a digital signature.

BACKGROUND

As organizations conduct increasing amounts of business processes online, ever greater numbers of documents are being communicated across networked environments while maintaining the integrity and confidentiality of individual document contents. Document control in digital environments often uses digital signatures to establish and maintain the confidentiality, authorization, and accountability of documents in these online business processes. Digital signatures may have documents being subject to cryptographic processes involving key-based encryption/decryption, as well as hashing functions and authentication code generation. Many business documents contain large amounts of data causing significant amounts of data processing to provide the encryption and other capabilities involved in support of the control processes depended upon in the online business processes.

The digital signature solution for document control provides assurance that the document has not been altered since it was sent and verification of the signer's digital identity. A digital signature computation for a document involves a hashing calculation, authenticated and unauthenticated attributes creation, and collateral information collection and inclusion within an encryption process involving the signer's private key in order to produce a signed content. Since the private key is a highly guarded property of a specific user residing on a specific computer, this sequence of steps presumes that the to-be-signed content and the infrastructure involved to compute the digital signature reside on the same computer.

For mobile devices, this presumption does not hold. The to-be-signed content may not reside on the mobile device, but rather, it may reside on a remote server. Mobile devices may not have sufficient infrastructure and processing resources to complete the computation of a digital signature in a reasonable amount of time, if at all. If document signing with a digital signature is expected to occur on the server hosting the to-be-signed content, the user cannot practically send their private key to the server because of security risks and possible compromise of the private key. Even with a mobile device having the infrastructure necessary for the digital signature computation, transmission of large documents between the mobile device (having the private key) and the server (hosting the large document) places a significant demand on the bandwidth of the network between the devices. Current digital signature processes do not consider these practical constraints for digitally signing large documents from mobile devices.

BRIEF DESCRIPTION OF DRAWINGS

Some embodiments are illustrated by way of example and not limitation in the figures of the accompanying drawings in which.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. Here and generally, an algorithm is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining," or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Digital signatures are a part of maintaining document control and ensuring that the integrity and confidentiality of each document will be maintained during online transmissions in the course of business processes. Often these documents contain large amounts of data which significantly challenges the computational capabilities and resources available for digital signature generation on mobile devices. The computation of digital signatures may involve a hashing function being performed on the to-be-signed content (content) at the mobile device, which may involve a significant amount of calculation. Additionally, the encryption of documents with the signer's private key may be equally strenuous on calculation resources for large documents. In cases where the content resides on a server and the private key on a small mobile device, the transmission of the content from the server to the device puts a significant burden on the bandwidth between the devices. Transmission of large documents for processing also involves a significant amount of local memory on the mobile device, which is typically a limited resource and may not be sufficient to retain large documents in a signing process. Existing solutions ignore these limitations and attempt to perform digital signature computations on the mobile device.

An electronic signature is an indication associated with a message, establishing that a signer endorses the contents of the message. For the purposes of the present disclosure, an electronic signature is an electronic sound, symbol, or process, attached to or logically associated with a contract or other record and executed or adopted by a person with the intent to sign the record. A digital signature is a form of electronic signature that is an indication associated with a message establishing that the message is endorsed and adopted by the signer. The digital signature is a mathematical manufacture to assure that the integrity and authenticity of the message, as well as the non-repudiation of the signer, is maintained throughout signing processes, including electronic transmission. The recipient of a message including the digital signature can verify that the message originated with the digital signer (assurance of signer identity), that the message has not been altered since the digital signature was applied (message integrity), and that the digital signer has not reneged on their signing of the message (non-repudiation of signer).

Consistent with an example embodiment, a distributive computation approach separates the process of digital signature generation into several parts, some of which are performed on the host server and some on the mobile device. Using distributive computation, only a small amount of data is transmitted between the host server and the mobile device. Additionally, only a small amount of data need be encrypted with the user's private key. This approach avoids there being significant amounts of calculation, memory, and transmission resources on the mobile device for the digital signing process.

The present methodology introduces the process of a distributive digital signature computation. Distributive computation may be applied in situations where the content resides on a server, the server contains Public Key Infrastructure (PKI) for the digital signature computation, and the private key, with which the content is signed, resides on a separate device. Using this process, digital signature computation is broken into a set of steps. Only a single step in the process may involve encryption of a relatively small amount of data with the signer's private key. This encryption step may be executed on the signer's device, and the remaining steps of the process may be executed on the server.

For example, from a mobile device, a signer may perform the steps of initiating and transmitting a signing request to the server. After receiving an encryption request from the server, the signer may use the mobile device to encrypt a hash value included in the encryption request and transmit the encrypted hash back to the server. The server may perform the remaining steps of the digital signature process. These remaining steps include receiving the signing request from the mobile device, which triggers the building and verifying of certificate chains corresponding to the signer. The server may continue by calculating a hash value corresponding with the to-be-signed content, creating authenticated attributes, and combining the hash value and the authenticated attributes into the encryption request that the server sends to the mobile device. After receiving the encrypted hash from the mobile device, the server concludes the digital signing process by generating unauthenticated attributes, producing the digital signature and signing the content with the digital signature. In this way content signed with a digital signature is produced at a server with a relatively few steps performed by the signer at the mobile device.

The distributive computation process allows the majority of the data associated with a large document to remain on the server. The present process does not involve transmission of large amounts of data to the client. This avoids the transmission of all certificates and additional collateral that would be undertaken if the entire digital signature generation and document signing process were conducted on the mobile device. A small number of data blocks may be transmitted between the client and the server to accomplish the signing process. The client may be a mobile device, and the small number of data blocks may be optimally suited to the bandwidth resources available in communicating the data to the mobile device. Additionally, the storage and processing resources of the mobile device may be limited and only suited to accommodating the small number of blocks of data. The initial signing request, the to-be-encrypted data, and the encrypted data may be transmitted between the client and the server by the data blocks. The client device does not contain and maintain support of the PKI typically involved in digital signature generation. The computation of digital signatures is more reliably and cheaply performed on the server. Both the original unsigned document and resulting signed documents may reside on the server and can be distributed from there.

Figure 1:
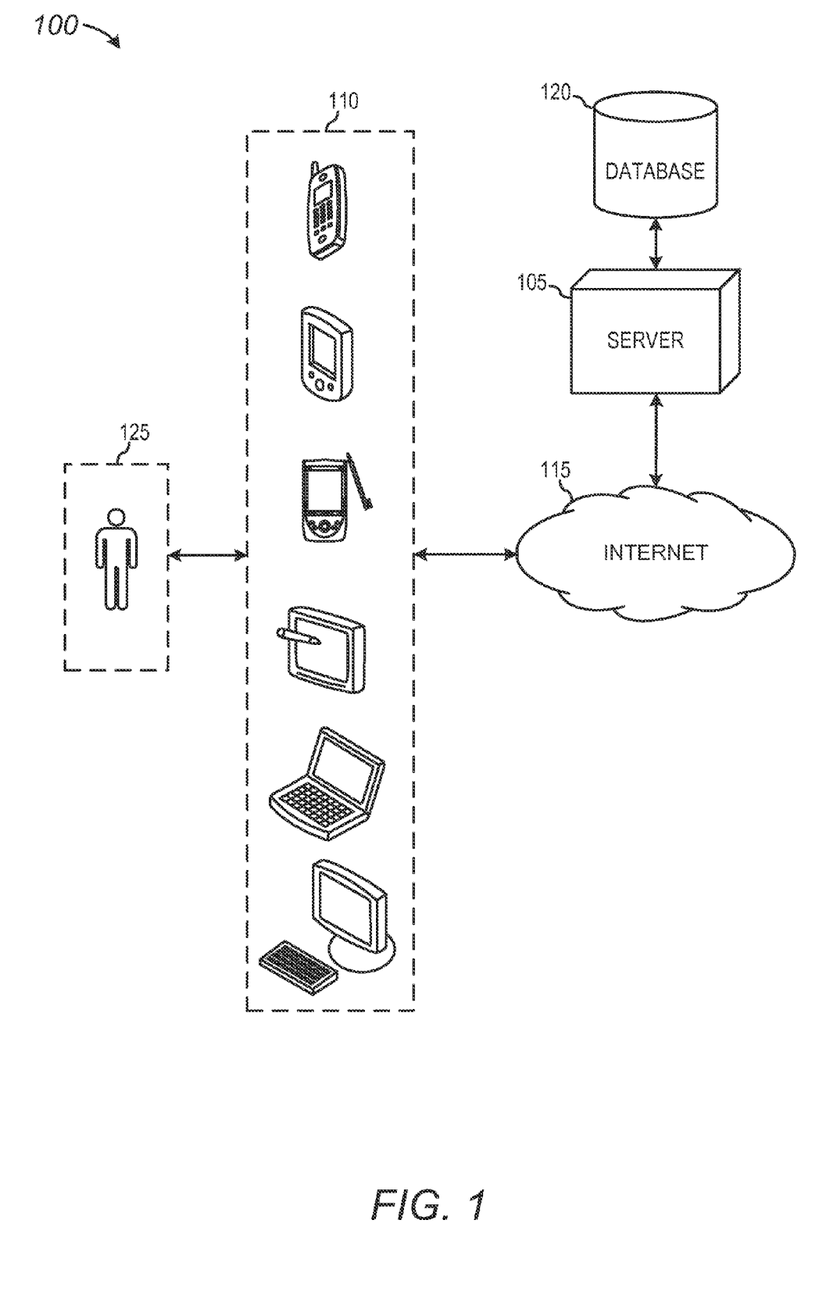
FIG. 1 is a block diagram illustrating a network environment to conduct distributive computation of digital signatures, according to an example embodiment.

FIG. 1 is a block diagram of a network environment 100 in which distributive computation of a digital signature may be performed. Within the network environment 100, a server 105 may be communicatively coupled to a client device 110 through an Internet 115. The server 105 may also be communicatively coupled through a local bus to a database 120 residing on a storage device or storage network. A signer 125 may use the client device 110 to initiate and conduct a signing process with the server 105. The server 105 may include a signing system (discussed below) to carry out the server-side processes involved in the distributive computation process. The client device 110 may be a mobile device; such as a smart phone, a personal digital assistant (PDA), a tablet, or a laptop computer; or be a desktop computer, for example.

Figure 2:
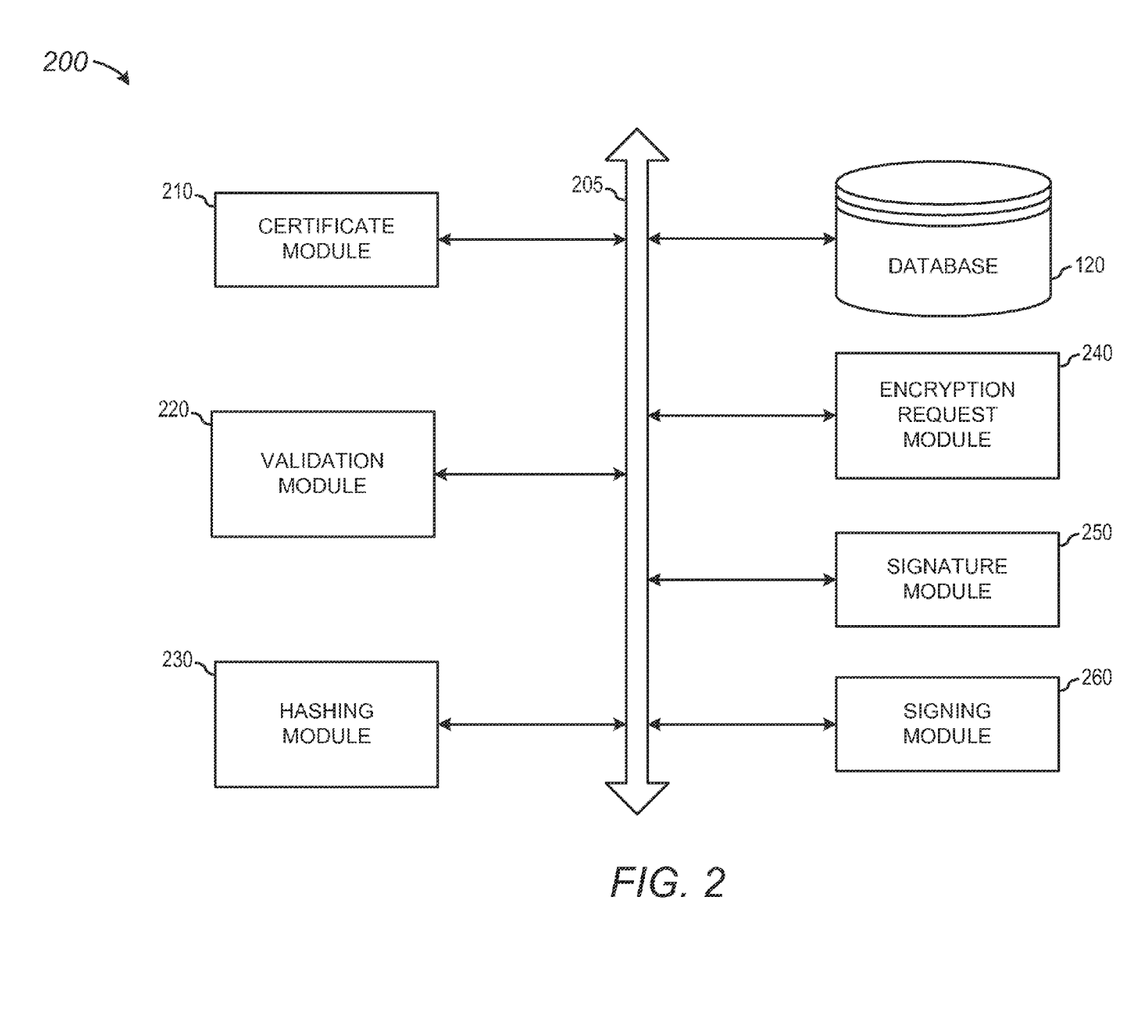
FIG. 2 is a block diagram illustrating a signing system, as may be used in an example embodiment.

FIG. 2 is a block diagram illustrating a signing system 200, according to an example embodiment. The signing system 200 may be implemented in the server 105 and be communicatively coupled to a local network 205 of the server 105. The signing system 200 may be coupled to at least one processor (not shown) within the server 105 and to the database 120. The database 120 may be used to store any and all of the data associated with the signing process. This data may include a signing request received from the client device 110, signed content, and unsigned content. The PKI, certificates, keys, data blocks, and signing attributes (each discussed below) may also be stored in the database 120, for example.

The signing system 200 may include a certificate module 210 to produce a set of certificates and include production of at least one certificate based on a public key. Production of the set of certificates may include the collection from certificate authorities (CA) of digital certificates relating to public keys. The certificate module 210 may be communicatively coupled through the local network 205 to a validation module 220 that validates the set of certificates provided by the certificate module 210. The validation module 220 may be in communication with the CA to establish that a valid status exists for a certificate. Accordingly, the validation module 220 produces a set of verified certificates.

A hashing module 230 may be included in the signing system 200 to calculate a hash value for the content. The hashing module 230 may calculate hash values according to a hashing specification. The hashing specification may be an explicit hashing algorithm for calculating a hash value or be the literal specification of an existing hashing scheme or hashing standard for use in the hashing calculation. For digital signatures, the hashing specification may be received in a signing request and used by the server 105 to calculate the hash value for the content identified in the signing request.

An encryption request module 240 may be used by the signing system 200 to combine the hash value coming from the hashing module 230 with a set of authenticated attributes to produce an encryption request to be transmitted to the client device 110 in response to the signing request. The user 125 may encrypt a hash value included in the encryption request to produce an encrypted hash value. The client device 110 may transmit the encrypted hash value to the signing system 200. A signature module 250 may be used to combine the encrypted hash value, returned by transmission from the client device 110, with a set of verified certificates and a set of unauthenticated attributes to produce the digital signature. A signing module 260 may apply the digital signature produced by the signature module 250 to the content identified in the signing request to produce a signed content. The signed content, as well as the unsigned content, may be stored in the database 120 and made available for further distribution.

Figure 3:
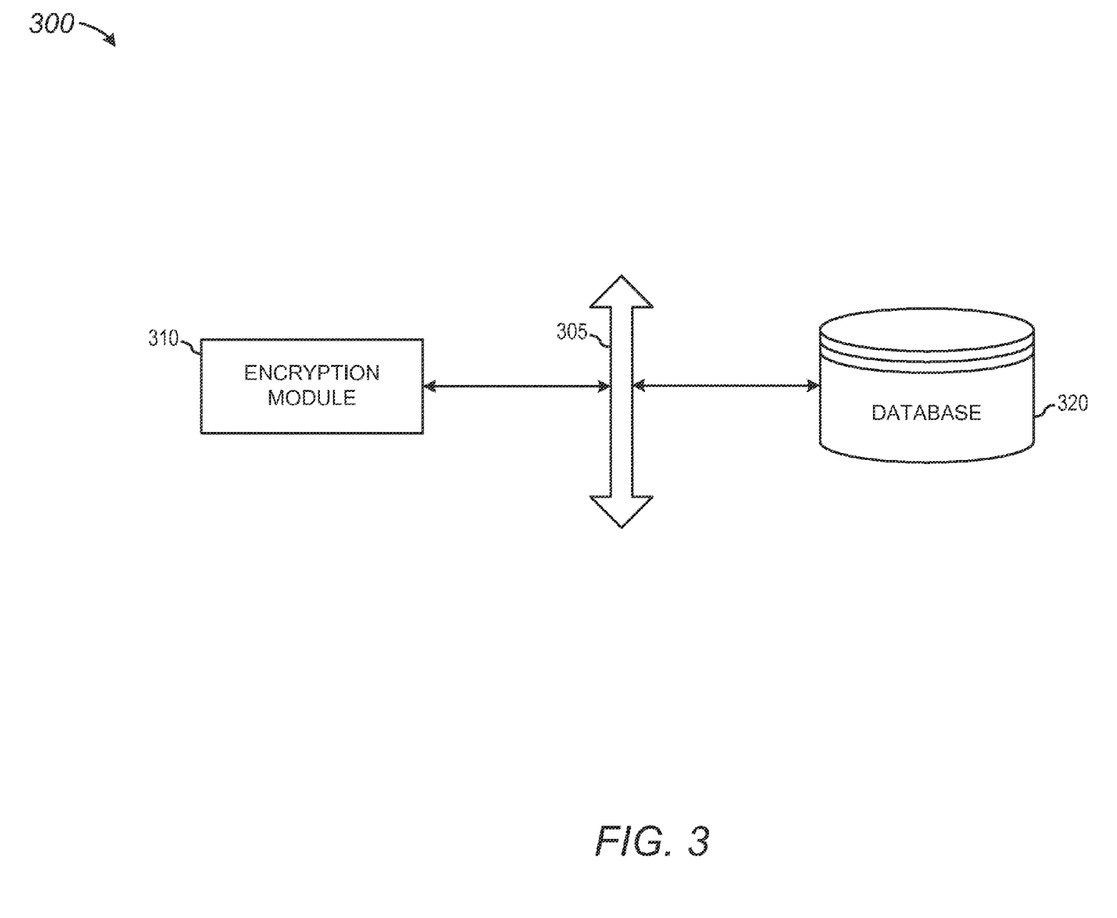
FIG. 3 is a block diagram illustrating an encryption system, according to an example embodiment.

FIG. 3 is a block diagram illustrating an encryption system 300, according to an example embodiment. The encryption system 300 may be implemented in the client device 110 and be communicatively coupled to a local device bus 305 in the client device 110. The encryption system 300 may be coupled to at least one processor (not shown) within the client device 110 and to a local database 320. The local database 320 may be used to store data associated with the encryption request (discussed above) transmitted from the signing system 200. The local database 320 may also store the private key (not shown) associated with the signer 125. Additionally, the local database 320 can be used to store any further data associated with the client device 110. The local database 320 may not be large enough to contain an entire to-be-signed document, which may reside in the database 120 on the server 105.

The encryption system can include an encryption module 310 communicatively coupled to the local device bus 305. The client device 110, in an encryption process directed by the signer 125, can cause the hash value received in the encryption request to be encrypted by the encryption module 310. The encryption module 310 may use the private key along with the hash value as input to the encryption process and thus produce a unique encrypted hash value.

Figure 4:
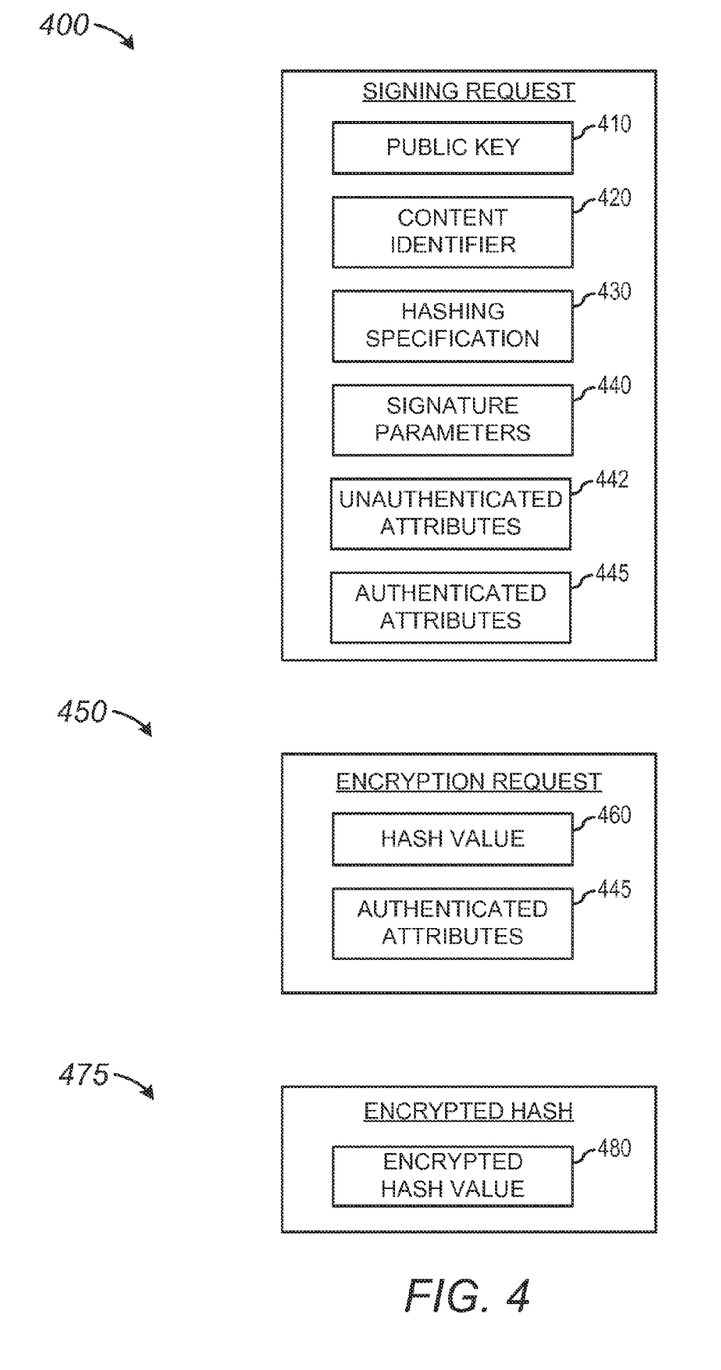
FIG. 4 includes block diagrams illustrating a signing request, an encryption request, and an encrypted hash; according to an example embodiment.

FIG. 4 includes a block diagram illustrating a signing request 400, according to an example embodiment. The signing request 400 may include a public key 410, which typically is a key corresponding to the signer 125 who may initiate the signing request 400. The signing request 400, when transmitter by the signer 125 from the client device 110 to the server 105, initiates the signing process. The signing request 400 may include a content identifier 420, which may be used to identify the content to be signed in the signing process. The signing request 400 may also include a hashing specification 430, which may be a hashing algorithm or a specification of a hashing scheme or hashing standard.

The signing request 400 may further include signature parameters 440 where one parameter in the signature parameters 440 may include an appearance specification. The signing request 400 may include any of a number of further data items which may include informational data, notification data, and status information. For example, a set of unauthenticated attributes 442 and a set of authenticated attributes 445 may be included by the signer 125 in the signing request 400 when sent from the client device 110 to the server 105. Further information and data beyond that discussed above, may be included in the signing request 400 according to implementation details of particular further example embodiments.

FIG. 4 also includes a block diagram illustrating an encryption request 450 that can be transmitted from the server 105 to the client device 110 in response to the signing request 400. The encryption request 450 may include a hash value 460 based on the content and calculated according to the hashing specification 430 provided in the signing request 400 from the client device 110. The encryption request 450 may also include the set of authenticated attributes 445.

FIG. 4 further includes a block diagram illustrating an encrypted hash 475 that may be transmitted from the client device 110 to the server 105. The encrypted hash 475 includes an encrypted hash value 480 that may in turn include the set of authenticated attributes 445. The hash value 460 that was included in the encryption request 450 and transmitted to the client device 110, may be encrypted by the user 125 at the client device 110 to produce the encrypted hash value 480. The set of authenticated attributes 445 may be, for example, included as a portion of the input to the encryption process performed by the user 125 at the client device 110. The encryption process performed by the user 125 that produces the encrypted hash value 480 may be considered conceptually as that portion of the signing process corresponding to the user 125.

According to various example embodiments, the set of unauthenticated attributes 442 and the set of authenticated attributes 445 may be provided from the client device 110 either singularly or in combination to the server 105 within the signing request 400. The server 105 may provide any combination (not shown) of the set of unauthenticated attributes 442 and the set of authenticated attributes 445 (shown) to the client device 110 within the encryption request 450. In accordance with certain further example embodiments, any combination of the set of unauthenticated attributes 442 and the set of authenticated attributes 445 may be included in the hash value 460 (not shown) and provided to the client device 110 within the encryption request 450. According to this latter example embodiment, when any combination of the set of unauthenticated attributes 442 and the set of authenticated attributes 445 is included in the hash value 460, only the hash value 460 would be included in the encryption request 450.

Figure 5:
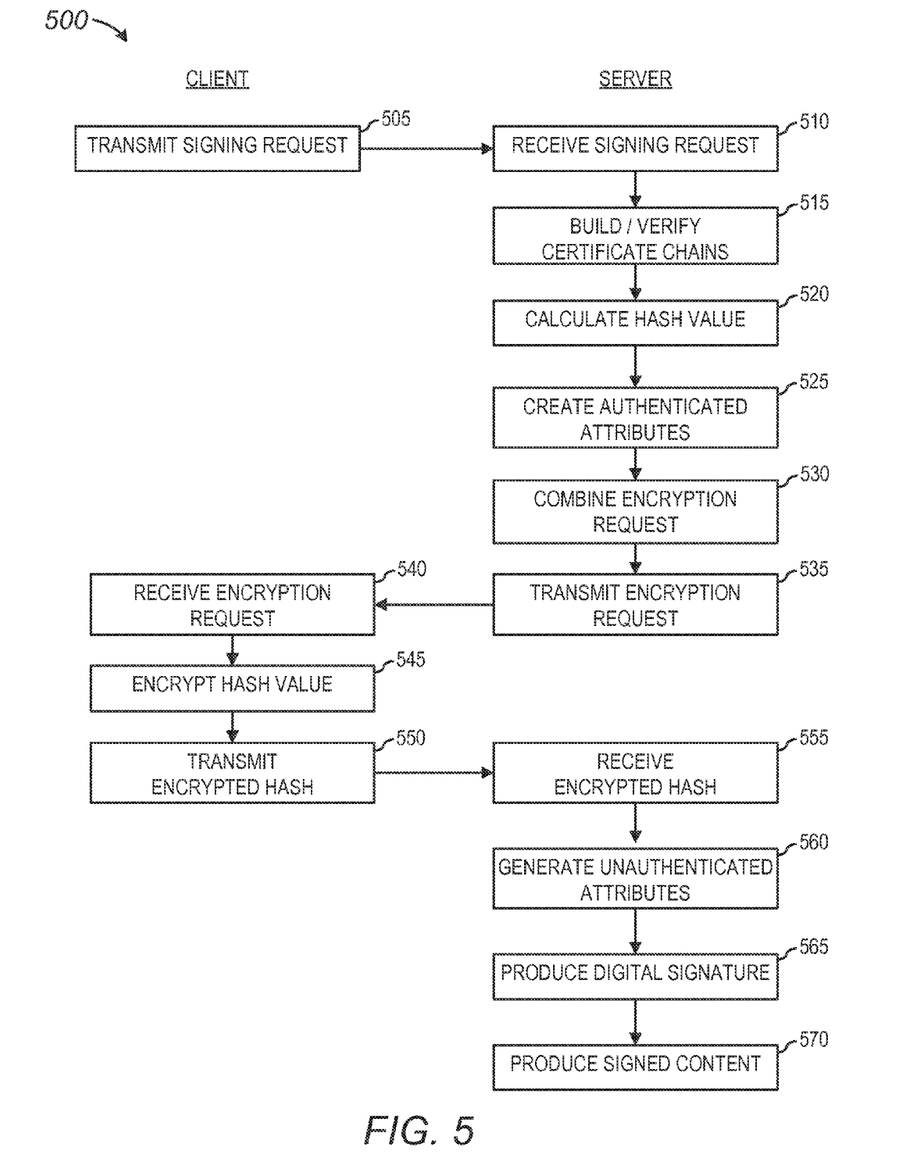
FIG. 5 is a flow diagram illustrating a method of distributive computation of a digital signature in a signing process, according to an example embodiment.

FIG. 5 is a flow diagram illustrating a method of distributive computation 500 of a digital signature, according to an example embodiment. The distributive computation 500 may be performed by any of the modules, logic, or components described herein.

Distributive computation 500 of digital signatures may be initiated from the client device 110. The signer 125 may transmit 505 a signing request 400 from their client device 110 to the server 105 where the signing request 400 may be stored in the database 120. The client device 110 of the signer 125 may be a mobile device communicatively coupled to the server 105 through a wireless network, for example. The remote device may operate as a client device 110 to the server 105 and take the form of a personal computer, such as a tablet, laptop, thin client, or desktop computer, for example. The communicative coupling between the client device 110 and the server 105 may be accomplished through any networked connection scheme providing data communication between the client device 110 of the signer 125 and the server 105. The networking scheme may be provided by wired, wireless, or optical (e.g., laser-based) networks to name a few example embodiments. Data communication between the client device 110 and the server 105 may incorporate any communication protocol and framework contemplated by one skilled in the art. Contemplated communication protocols may include Transmission Control Protocol (TCP) and Internet Protocol (IP), User Datagram Protocol (UDP), Post Office Protocol (POP), and Hypertext Transfer Protocol (HTTP) for example. Additionally, these protocols may be incorporated in a local area network (LAN), a wide area network (WAN), or a point-to-point link between at least two computers, to name a few possible example transmission framework environments.

The distributive computation 500 may continue with the server 105 receiving 510 the signing request 400 from the client device 110. The signing request 400 may include the content identifier 420, which contains data to identify the to-be-signed content (content). The content may reside entirely on the server 105 or alternately within the server 105 and any additional storage medium or devices providing data storage or caching within a storage domain of the server 105. A storage area network (SAN) providing access to a consolidated set of storage devices, which appear to the server 105 and resident operating system as a locally attached storage device, are example embodiments of a storage domain that may cumulatively provide the data included in the content.

The signing request 400 may also include the hashing specification 430 or hashing algorithm along with the signature parameters 440 (such as a signature appearance, for example). The signing request 400 may additionally contain a public key 410 belonging to the signer or public key certificate. The public key 410 of a signer, which is not considered a property to be guarded, does not involve significant security considerations be taken when transmitting the signing request 400. In this way, transmission of the signer's private key and the associated security concerns are avoided. The signing request 400 and its constituent parts may be stored in the database 120 on the server 105 in such a manner that the particular set of identifiers, specifications, and parameters used in the signing request 400 can be maintained in continued association with the originating signing request 400.

Digital signatures provide document authenticity by verifying a signer's digital identity with the use of digital certificates. The certificate module 210 and the validation module 220 build and verify 515 a set of certificates or "certificate chains" based on the signer's public key certificate. A PKI is a system and standard that provides a digital certificate enabling a document's recipient to know whether a specific public key 410 really belongs to a specific individual. Digital certificates bind a person (or entity) to a public key 410. The CAs issue these certificates, and recipients may trust the CA issuing the certificate to maintain the authenticity of the digital certificate.

The certificate module 210 may produce a set of certificates including a key certificate based in part on the public key 410 bound to a corresponding key certificate. The PKI may maintain further certificates based on standards such as public-key cryptography standards (PKCS), a registration authority, and a certificate repository, to name a few of the facilities available for certification. By validating the set of certificates, the validation module 220 may produce a set of verified certificates. The validation module 220 may expect that the public key 410 is public and corresponds to the signer 125 associated with the signing request 400. Validation of the public key 410 by the validation module 220 may include verifying the key certificate with the associated CA. As part of the process of authenticating a digital certificate corresponding to the public key 410, the validation module 220 may check the certificate's status. The validation module 220 may check certificate validity using standards such as the certificate revocation list (CRL) and the online certificate status protocol (OCSP) to assess an up-to-date status of the proposed certificate. If a certificate expires or a corresponding private key is compromised, the CA will revoke the certificate and keep a record of the revocation that may be revealed in the status check of the digital certificate. In this way, the validation module 220 may verify the signer's registered digital identity, go on to validate the set of certificates, and produce the set of verified certificates.

The hashing module 230 may calculate 520 the hash value 460 for the content. The hash value 460 be used to establish authenticity and maintain integrity of the content. The hash value 460 may be correlated with the content such that any change in the content is detectable by a corresponding change in a recalculated hash value. If at any time there is a question as to the validity of the content, a current hash value may be calculated and compared with an earlier hash value known to have corresponded with the original content. The hashing module 230 can calculate the hash value 460 of the identified content with the parameters specified in the signing request 400. The parameters of the signing request 400 may include a specification to use a generally available hashing scheme or may include a particular hashing algorithm to be used in calculating the hash value 460 for the content. The server 105 may retrieve the content from the storage domain belonging to the server 105 along with the hashing specification 430 and trigger the hashing module 232 to perform the hashing calculation to produce the hash value 460 for the content.

Additionally, the server 105 may create 525 the set of authenticated attributes 445 according to the signature parameters 440 in the signing request 400. The encryption request module 240 combines 530 signing information into the encryption request 450 including information that allows the signer 125 to knowledgeably sign for the subject content identified in the signing request 400. The encryption request module 240 may combine the calculated hash value 460 and the set of authenticated attributes 445 into the encryption request 450 and cause the server 105 to transmit 535 the encryption request 450 to the client device 110 for encrypting by the signer 125. According to a further example embodiment, the encryption request module 240 may also combine the set of unauthenticated attributes 442 along with the calculated hash value 460 and the set of authenticated attributes 445 into the encryption request 450. According to an additional example embodiment, the hashing module 230 may include the set of authenticated attributes 445 as input to the hashing calculation and produce the hash value 460 and include the set of authenticated attributes 445 as a single value. In this latter example, the encryption request 450 would include the hash value 460 and not the set of authenticated attributes 445 separately.

Accordingly, the actual content may not be transmitted to the client device 110. In some situations, the client device 110 may not have enough resources, such as memory, to store the entire content. In the event the content is a large document, utilizing the distributive computation 500 process for digital signatures spares the client device 110 from having to store a large volume of data, expend the calculating resources and time to generate the hashing value, and manage the transmission resources for sending and receiving the large amount of data.

At the client device 110, the signer 125 may receive 540 the encryption request 450 from the server 105. The signer 125 may review the set of authenticated attributes 445 included in the encryption request 450 to assure that the indications of the authenticity provided by the attributes match expectations. The signer 125 may also inspect the hashing value to assure that the hash value 460 has been generated by the server 105. Using their private key, the signer 125 may then encrypt 545 the hash value 460 included in the encryption request 450 with the encryption module 310 to produce the encrypted hash value 480. The encrypted hash value 480 may be inserted in the encrypted hash 475 to be transmitted to the server 105. By implementing the encryption process on the hash value 460 with the encryption module 310 the encryption request 450 can be completed and the signer 125 may be certain that the digital signature subsequently created by the server 105, is provided with a structured data quantity that validates and authenticates the content throughout the distributive computation 500. Thus, according to the example embodiment, validation and authentication of signed content may be assured, even though the content resides remotely on the server 105 and is not transmitted to the client device 110 during the signing process. The server 105 may later validate the digital signature for integrity and authenticity, for example. Once encryption is complete, the signer 125 transmits 550 the encrypted hash 475 from the client device 110 to the server 105.

The server 105 may receive 555 the encrypted hash 475 transmitted from the client device 110. Once the encrypted hash 475 is received, the server 105 generates 560 a set of unauthenticated attributes corresponding to the content and the signing request 400. The signature module 250 combines the encrypted hash value 480, from the encrypted hash 475, with the unauthenticated attributes and the set of verified certificates. The combination of the encrypted hash 475, the set of verified certificates, and the unauthenticated attributes produces 565 the digital signature for the content.

The signing module 260 applies the digital signature to the content to produce 570 the signed content and thus conclude the distributive computation 500. The result can be saved in the database 120 as the signed content and may include the computed digital signature. The hash value 460 may be utilized to verify the authenticity and integrity of the encrypted hash 475 throughout the distributive computation 500.

Certain embodiments are described herein as including logic or a number of components, modules, or mechanisms. Modules may constitute either software modules (e.g., code embodied (1) on a non-transitory machine-readable storage medium) or hardware-implemented modules. A hardware-implemented module is tangible unit capable of performing certain operations and may be configured or arranged in a certain manner. In example embodiments, at least one computer system (e.g., a standalone, client or server computer system) or at least one processor may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured at different times as different hardware-implemented modules. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by at least one processor that can be temporarily configured (e.g., by software) or permanently configured to perform the relevant operations. Whether temporarily or permanently configured, such processors may constitute processor-implemented modules that operate to perform at least one operations or functions. The modules referred to herein may, in some example embodiments, comprise processor-implemented modules.

Similarly, the methods described herein may be at least partially processor-implemented. For example, at least some of the operations of a method may be performed by at least one processor or processor-implemented module. The performance of certain of the operations may be distributed among the at least one processor, not only residing within a single machine, but deployed across a number of machines. In some example embodiments, the processor or processors may be located in a single location (e.g., within a home environment, an office environment or as a server farm), while in other embodiments the processors may be distributed across a number of locations.

The at least one processor may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via at least one appropriate interface (e.g., an Application Program Interface (API).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a non-transitory machine-readable storage medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by at least one programmable processor executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 6:
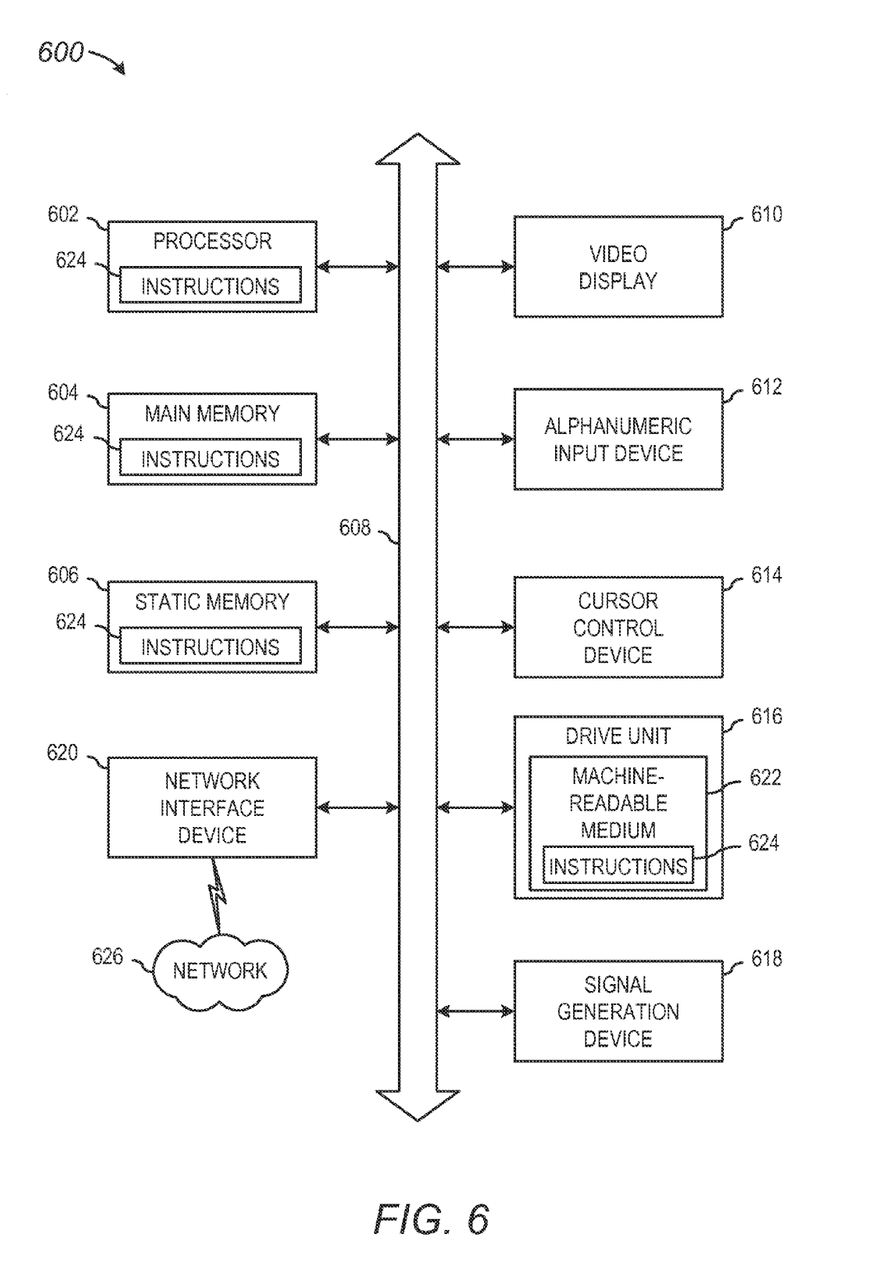
FIG. 6 is a block diagram of machine in the example form of a computer system within which a set instructions, for causing the machine to perform at least one of the methodologies discussed herein, may be executed.

FIG. 6 is a block diagram of a machine in the example form of a computer system 600 within which instructions, for causing the machine to perform at least one of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform at least one of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker), and a network interface device 620.

The disk drive unit 616 includes a non-transitory machine-readable storage medium 622 on which is stored at least one sets of instructions and data structures (e.g., software) 624 embodying or utilized by at least one of the methodologies or functions described herein. The instructions 624 may also reside, completely or at least partially, within the main memory 604 and/or within the processor 602 during execution thereof by the computer system 600, the main memory 604 and the processor 602 also constituting non-transitory machine-readable media.

While the non-transitory machine-readable storage medium 622 is shown in an example embodiment to be a single medium, the term "non-transitory machine-readable storage medium" may include a single medium or multiple media (e.g., a centralized or distributed database, and/or associated caches and servers) that store the at least one instructions or data structures. The term "non-transitory machine-readable storage medium" shall also be taken to include any tangible medium that is capable of storing, encoding or carrying instructions for execution by the machine and that cause the machine to perform at least one of the methodologies of the present example embodiments, or that is capable of storing, encoding or carrying data structures utilized by or associated with such instructions. The term "non-transitory machine-readable storage medium" shall accordingly be taken to include, but not be limited to, solid-state memories, and optical and magnetic media. Specific examples of non-transitory machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM) and Digital Video Disc Read-Only Memory (DVD-ROM).

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, Plain Old Telephone Service (POTS) networks, and wireless data networks (e.g., WiFi and WiMax networks). The term "transmission medium" shall be taken to include any intangible medium that is capable of encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader scope of the application. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single implementation or demonstration of a concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Although the present application includes descriptions with reference to specific example embodiments, it will be evident that various modifications and changes may be made to these embodiments without departing from the broader scope of the application. Accordingly, the specification and drawings are to be regarded in an illustrative rather than a restrictive sense.

Plural instances may be provided for components, operations, or structures described herein as a single instance. Finally, boundaries between various components, operations, and data stores may be somewhat arbitrary, and particular operations may be illustrated in the context of specific illustrative configurations. Other allocations of functionality are envisioned and may fall within the scope of the application(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the application. At least one feature from any embodiment may be combined with at least one feature of any other embodiment without departing from the scope of the disclosure.

A recitation of "a", "an," or "the" is intended to mean "at least one" unless specifically indicated to the contrary. In addition, it is to be understood that functional operations, such as "awarding," "locating," "permitting," and the like, are executed by game application logic that accesses, and/or causes changes to, various data attribute values maintained in a database or other memory.

In this document, the terms "a" or "an" are used, as is common in patent documents, to include at least one than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, methods, system features, and system mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal Global Positioning System(GPS), PDA, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader scope of the disclosure as set forth in the claims and that the disclosure is intended to cover all modifications and equivalents within the scope of the following claims.

The Abstract of the Disclosure is provided to comply with rules involving an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments involve more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving an encrypted hash at a server communicatively coupled to a computer network, the encrypted hash being transmitted from a device over the computer network;
combining the encrypted hash with a set of verified certificates to produce a digital signature, wherein the set of verified certificates are certificates that include at least one certificate based on a public key, and wherein the set of certificates are well-formed, valid, correctly signed, and trustworthy; and
applying the digital signature to a content to produce a signed content, the content determined by a content identifier included in a signing request.

2. The method of claim 1, further comprising:
receiving the signing request including the content identifier from the device; and transmitting to the device, an encryption request including a hash value corresponding to the content and a set of authenticated attributes.

3. The method of claim 1, further comprising:
calculating a hash value corresponding to the content and according to a hashing specification; and
combining the hash value and a set of authenticated attributes to generate at least a portion of an encryption request.

4. The method of claim 1, further comprising:
retrieving the content and a hashing specification included in the signing request; and
as designated by the hashing specification, calculating a hash value based on the content,
wherein the hashing specification is a hashing algorithm.

5. The method of claim 1, further comprising:
producing a set of certificates including a key certificate associated with a key; and
validating the set of certificates to produce the set of verified certificates,
wherein the key is a public key corresponding to a signer associated with the signing request; and
further wherein the validating includes verifying the key certificate with a certificate authority.

6. The method of claim 1, further comprising:
generating a set of unauthenticated attributes,
wherein the combining includes combining the set of unauthenticated attributes to produce the digital signature.

7. The method of claim 1, further comprising generating a set of authenticated attributes as specified by a set of parameters included in the signing request.

8. The method of claim 1, wherein the signing request includes:
a key;
a content identifier;
a hashing specification; and
a set of signature parameters,
wherein the key is a public key corresponding to a signer associated with the signing request; and
further wherein at least one signature parameter includes an appearance specification and the hashing specification specifies a hashing scheme.

9. The method of claim 1, wherein the receiving includes receiving the encrypted hash encrypted according to a private key retained on the device and associated with a signer.

10. A system comprising:
a server, having a processor coupled to a memory, to receive an encrypted hash transmitted from a device, the server communicatively coupled by a computer network to the device;
a signature module to combine the encrypted hash with a set of verified certificates to produce at least a portion of a digital signature, wherein the set of verified certificates are certificates that include at least one certificate based on a public key, and wherein the set of certificates are well-formed, valid, correctly signed, and trustworthy; and
a signing module to apply the digital signature to a content and produce a signed content, the content determined by a content identifier included in a signing request.

11. The system of claim 10, further comprising:
a hashing module to calculate a hash value corresponding to the content, the hash value calculated according to a hashing specification included in the signing request; and
an encryption request module to combine the hash value and a set of authenticated attributes to generate at least a portion of an encryption request,
wherein the server transmits the encryption request, including the hash value and a set of authenticated attributes, to the device.

12. The system of claim 10, further comprising:
a certificate module to produce a set of certificates including a key certificate associated with a key; and
a validation module to validate the set of certificates and produce the set of verified certificates,
wherein the key is a public key corresponding to a signer associated with the signing request; and
further wherein the validation module verifies the key certificate with a certificate authority.

13. The system of claim 10, wherein:
the server generates a set of authenticated attributes as specified by a set of parameters included in the signing request;
the encryption request module combines the set of authenticated attributes with the hash value to generate at least a portion of an encryption request; and
the server transmits to the device the encryption request including the hash value and the set of authenticated attributes.

14. The system of claim 10, wherein:
the server generates a set of unauthenticated attributes corresponding to the content and the signing request and
the signature module further combines the set of unauthenticated attributes with the encrypted hash and the set of verified certificates to produce the digital signature.

15. The system of claim 10, wherein the signing request includes:
a key;
a content identifier;
a hashing specification; and
a set of signature parameters,
further wherein the key is a public key corresponding to a signer associated with the signing request and
wherein at least one signature parameter includes an appearance specification and the hashing specification specifies a hashing scheme.

16. A method comprising:
receiving, from a server having a processor coupled to a memory, an encryption request including a set of authenticated attributes and a hash value corresponding to a content designated in a signing request, wherein the set of authenticated attributes and the hash value are received at a same time;
encrypting the hash value to produce an encrypted hash value; and
transmitting the encrypted hash value to the server.

17. The method of claim 16, further comprising:
transmitting the signing request including a content identifier and a hashing specification to the server,
wherein the content identifier designates the content corresponding to the hash value received in the encryption request.

18. The method of claim 16, further comprising:
determining a content identifier corresponding to the content;
identifying a hashing specification designating a hashing scheme to generate the hash value in the encryption request;
including the content identifier and the hashing specification in the signing request; and
transmitting the signing request to the server.

19. The method of claim 16, further comprising:
including in the signing request at least one of a public key, signature parameters, unauthenticated attributes, and authenticated attributes.

20. The method of claim 16, wherein the encrypting includes using a private key to produce the encrypted hash value.

21. A device having a processor coupled to a memory comprising:
a communication module to receive an encryption request including a hash value and a set of authenticated attributes from a server, the communication module communicatively coupled by a computer network to the server, wherein the set of authenticated attributes and the hash value are received at a same time; and
an encryption module to encrypt the hash value and produce an encrypted hash value, the hash value corresponding to content associated with the server,
wherein the device transmits the encrypted hash value to the server.

22. The device of claim 21, wherein the communication module transmits to the server a signing request including a hashing specification and a content identifier to determine the content.

23. A non-transitory machine-readable storage medium comprising instructions, which when implemented by at least one processor, perform operations comprising:
receiving a signing request including a hashing specification and a content identifier at a server communicatively coupled to a computer network;
transmitting to a device an encryption request including a set of authenticated attributes and a hash value produced according to the hashing specification and corresponding to a content designated by the content identifier, wherein the set of authenticated attributes and the hash value are transmitted at a same time;
receiving an encrypted hash value transmitted by the device through the computer network;
combining the encrypted hash value with a set of verified certificates to produce a digital signature, wherein the set of verified certificates are certificates that include at least one certificate based on a public key, and wherein the set of certificates are well-formed, valid, correctly signed, and trustworthy; and
applying the digital signature to the content to produce a signed content.

* * * * *